(12) United States Patent
Hall

(10) Patent No.: US 7,143,998 B1
(45) Date of Patent: Dec. 5, 2006

(54) VIBRATION ABSORBER JACK

(75) Inventor: Corby Vincent Hall, Chula Vista, CA (US)

(73) Assignee: The United States of America as represented by the Secrectary of the Navy, Washington, DC (US)

( * ) Notice: Subject to any disclaimer, the term of this patent is extended or adjusted under 35 U.S.C. 154(b) by 568 days.

(21) Appl. No.: 10/661,858

(22) Filed: Sep. 12, 2003

(51) Int. Cl.
*B66F 3/08* (2006.01)

(52) U.S. Cl. .................. 254/98; 254/8 B; 254/134

(58) Field of Classification Search .............. 254/98, 254/133 R, 134, DIG. 4, DIG. 1, 102, 8 B, 254/8 R
See application file for complete search history.

(56) References Cited

U.S. PATENT DOCUMENTS

| | | | |
|---|---|---|---|
| 1,970,619 A * | 8/1934 | Pachowicz | 254/98 |
| 2,140,617 A * | 12/1938 | Castady | 182/141 |
| 4,015,736 A | 4/1977 | Erickson | |
| 4,650,389 A | 3/1987 | Mulqueen | |
| 5,277,405 A * | 1/1994 | McSwain | 254/98 |
| 5,297,779 A * | 3/1994 | Collins et al. | 254/98 |
| 5,870,872 A | 2/1999 | Hinnen et al. | |
| 5,951,776 A | 9/1999 | Selyutin et al. | |
| 6,189,864 B1 * | 2/2001 | Crow et al. | 254/8 B |
| 6,607,341 B1 | 8/2003 | Wade | |

\* cited by examiner

*Primary Examiner*—Lee D. Wilson
(74) *Attorney, Agent, or Firm*—Mark O. Glut

(57) ABSTRACT

A vibration absorber jack including a tripod type base, a jack, an absorber positioning mechanism, and a vibration absorber holder. The jack is attached to the base, the absorber positioning mechanism disposed on top of the jack; and, the vibration absorber holder attached to the absorber positioning mechanism such that the vibration absorber holder can be positioned and moved by the absorber positioning mechanism.

10 Claims, 4 Drawing Sheets

US 7,143,998 B1

VIBRATION ABSORBER JACK

STATEMENT OF GOVERNMENT INTEREST

The invention described herein may be manufactured and used by or for the Government of the United States of America for governmental purposes without payment of any royalties thereon or therefor.

BACKGROUND

The present invention relates to a vibration absorber jack. More specifically, but without limitation, the present invention relates to a vibration absorber jack for the installation and removal of cabin vibration absorbers in aircraft.

Aircraft, specifically military helicopters, have cabin vibration absorbers. Cabin vibration absorbers are typically defined, but without limitation, as mechanisms that minimize or take in aircraft cabin vibrations without echo, recoil, or reflection. Cabin vibration absorbers are commonly used in helicopters and are typically disposed in the cabin overhead above passengers or cargo. Military helicopters, specifically the Navy's MH-60S helicopter, utilize a 140-pound vibration absorber. Because of the continuous and the strenuous use by the military these vibration absorbers must often be changed or repaired. The current method to install vibration absorbers includes utilizing a minimum of three people, two to lift and position the absorber, and one to align the bolts with corresponding anchor nuts. This process may take a period of time, causing fatigue to the installers. This procedure can cause potential harm to the installers and/or damage to the aircraft. Utilizing this procedure, the bolts may be improperly installed or misaligned. Furthermore, misalignment between the bolts has caused bolt shear failure that can cause harm to passengers and/or damage to cargo or the aircraft.

Thus, there is a need in the art to provide a method or mechanism that incorporates the listed benefits without the limitations inherent in present methods. For the foregoing reasons, there is a need for a vibration absorber jack which helps install a vibration absorber.

SUMMARY

The instant invention is directed to a vibration absorber jack that satisfies the needs enumerated above and below.

The present invention is directed to a vibration absorber jack that includes a tripod type base, a jack, an absorber positioning mechanism, and a vibration absorber holder. The jack is attached to the base; the absorber positioning mechanism is disposed on top of the jack; and, the vibration absorber holder is attached to the absorber positioning mechanism such that the vibration absorber holder can be positioned and moved by the absorber positioning mechanism.

The present invention is directed to a vibration absorber jack that allows one person to install a vibration absorber.

It is an object of the invention to provide a vibration absorber jack that minimizes bolt misalignment in the installation of vibration absorbers.

It is an object of the invention to provide a vibration absorber jack that provides for safe installation of a vibration absorber.

DRAWINGS

These and other features, aspects and advantages of the present invention will become better understood with reference to the following description and appended claims, and accompanying drawings wherein:

DESCRIPTION

Figure 1:
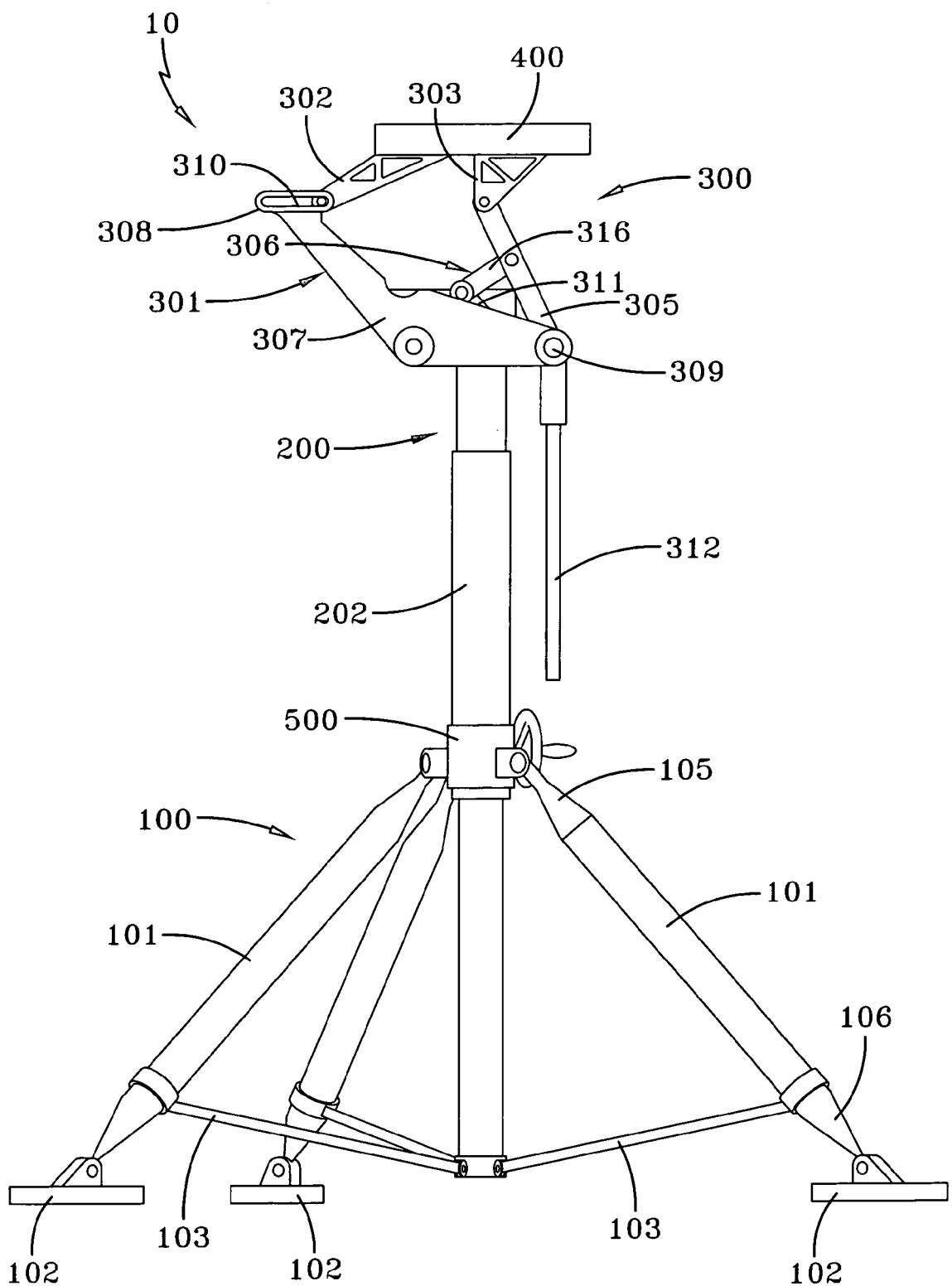
FIG. 1 is a side view of an embodiment of the vibration absorber jack.

The preferred embodiment of the present invention is illustrated by way of example below and in FIGS. 1, 2, 3 and 4. As seen in FIG. 1, the vibration absorber jack 10 includes a tripod type base 100, a jack 200, an absorber positioning mechanism 300, and a vibration absorber holder 400.

In the discussion of the present invention, the invention will be discussed in a military helicopter environment; however, this invention can be utilized for any type of need that requires a jack, specifically, but without limitation, in the installation of a vibration absorber.

A tripod type base 100 is typically defined, but without limitation, as a three legged support or stand. As seen in FIG. 1, each of the legs 101 may have a leg base 102. Each leg base 102 is attachable to the cabin floor 50.

Figure 2:
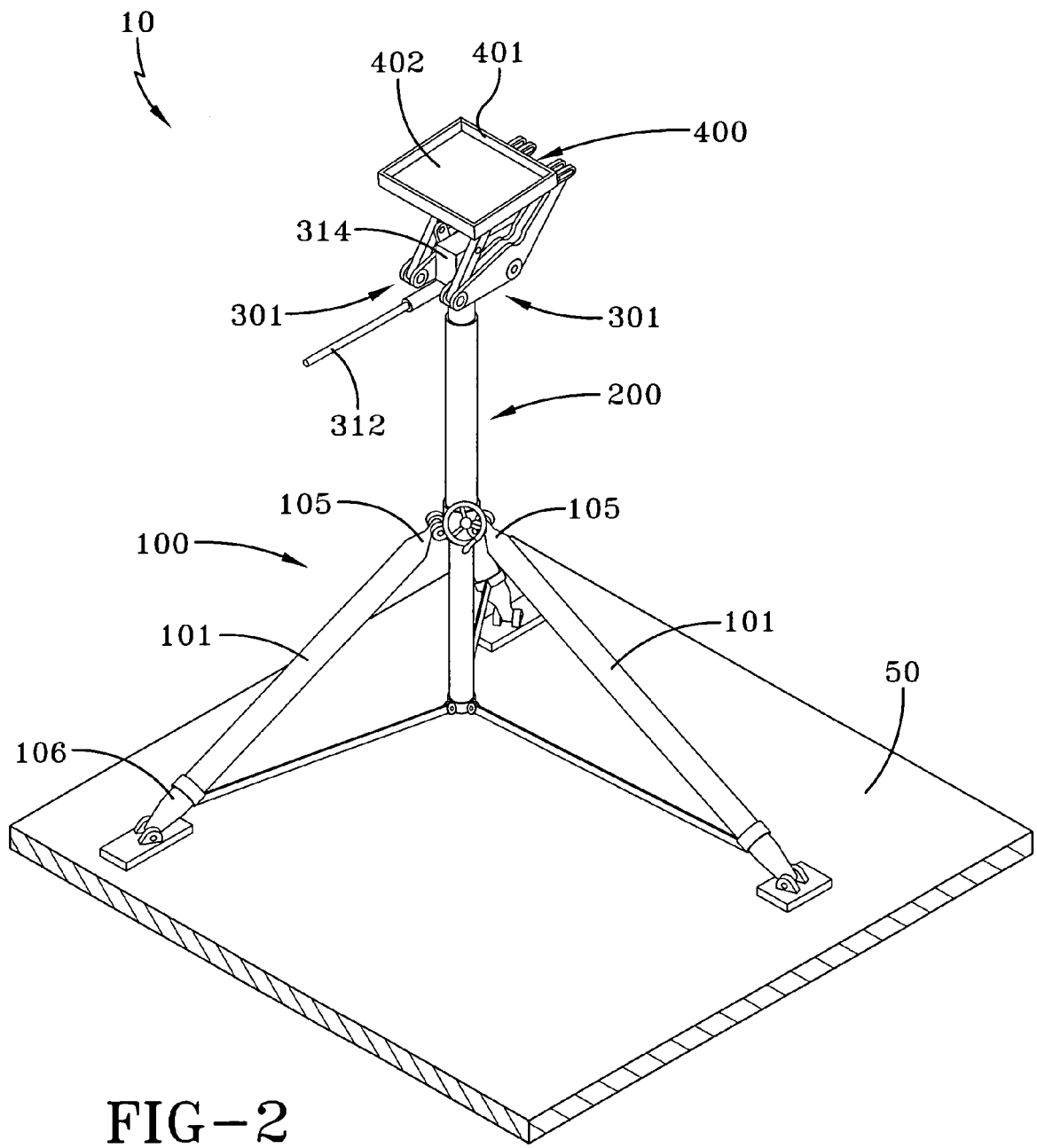
FIG. 2 is a perspective view of an embodiment of the vibration absorber jack.
Figure 4:
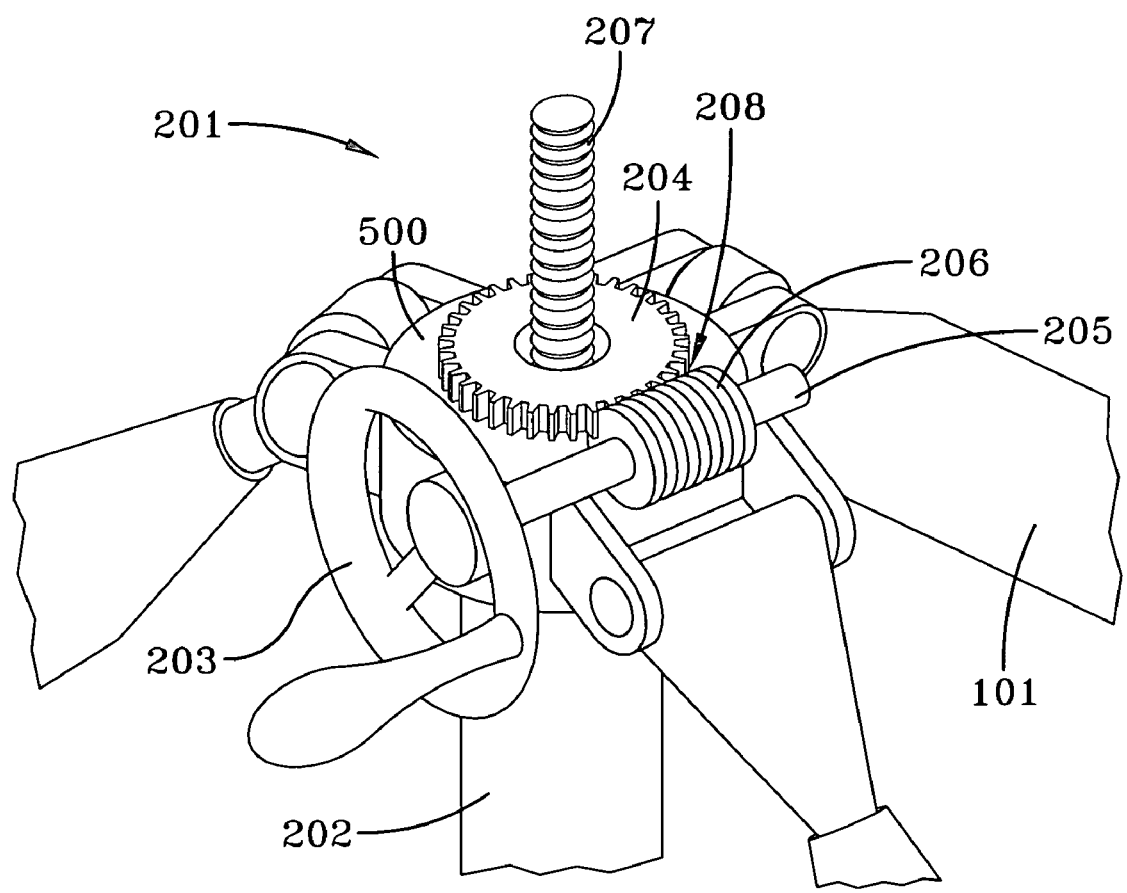
FIG. 4 is a perspective inner view of an embodiment of the vibration absorber jack.

A jack 200 is typically defined, but without limitation, as a device that lifts heavy objects short heights, using various mechanical, pneumatic or hydraulic methods. The preferred type of jack 200 is a ball-screw jack 200. A ball-screw jack 200 typically features a heavy-duty screw/nut drive system utilizing a series of bearing balls between the screw and nut to improve the screw's mechanical efficiency and wear life. As seen in FIG. 4, the jack 200 may include a worm gear assembly 201, a jack shaft 202, and a jack wheel 203. The worm gear assembly 201, the jack shaft 202 and the jack wheel 203 communicate with each other such that when turning the jack wheel 203, the worm gear assembly 201 is turned and the worm gear assembly 201 adjusts the height of the jack shaft 202. The jack shaft 202 may be telescopic in nature. As seen in FIGS. 1 and 2, the tripod type base 100 may also include tripod levers 103 that are rotatably attached to each leg 101 and slidably attached to the jack shaft 202. The tripod levers 103 can slide up and down the jack shaft 202 to fold the legs 101 together for storage.

As seen in FIG. 4, the worm gear assembly 201 may include a worm gear center gear 204, a jack wheel shaft 205, a worm gear cylinder gear 206 and a jack inner shaft 207. The jack wheel shaft 205 extends from the jack wheel 203 such that turning the jack wheel 203 correspondingly turns the jack wheel shaft 205. The worm gear cylinder gear 206 overlaps the jack wheel shaft 205. Both the worm gear cylinder gear 206 and jack wheel shaft 205 are axially aligned such that when turning the jack wheel shaft 205, the worm gear cylinder gear 206 is also turned. The worm gear cylinder gear 206 and worm gear center gear 204 communicate such that when the worm gear cylinder gear 206 is turned by the jack wheel 203, the worm gear center gear 204 is also turned. This is accomplished by a teeth and grooves system 208. The worm gear center gear 204 communicates with the jack inner shaft 207 such that when the worm gear center gear 204 is turned the jack inner shaft 207 is moving in a corresponding upward or downward direction. As seen in FIG. 4, the jack inner shaft 207 may be threaded and the worm gear center gear 204 and jack inner shaft 207 may communicate by a teeth and grooves system. The worm gear assembly 201 may be disposed within the jack shaft 202.

The vibration absorber jack 10 may include a collar 500. The collar 500 may envelop a portion of the the jack shaft 202. Each leg 101 may be rotatably attached to the collar 500. As seen in FIGS. 1 and 2, in the preferred embodiment, each leg 101 has a leg first end portion 105 and a leg second end portion 106. The leg first end portion 105 is attached to the collar 500, while the leg second end portion 106 is attachable to the cabin floor 50. As previously described, at the leg second end portion 106 there may be leg base 102 that is directly attachable to a floor. Within the collar 500, a portion of the jack shaft 202 and the worm gear assembly 201 may be located. The jack wheel 203 may be located on the outside of the collar 500, with a portion of the jack wheel shaft 205 emanating from the collar 500.

As shown in FIGS. 1 and 2, the absorber positioning mechanism 300 may be a pivoting assembly 300. The pivoting assembly 300 includes a pivoting assembly main bracket 301, a first pivoting assembly bracket 302, a second pivoting assembly bracket 303, a stabilizer 306, and a linkage 305. The pivoting assembly main bracket 301 is attached to the top portion of the jack 200, specifically the top portion of the jack shaft 202. As the jack shaft 202 is lowered and raised the pivoting assembly 300 moves in tandem with the jack shaft 202.

The pivoting assembly main bracket 301 may include two bracket legs 307. As seen in FIGS. 1 and 2, the pivoting assembly main bracket 301 is an angle bracket with an angle between the bracket legs 307 at least 90 degrees but no more than 180 degrees. The pivoting assembly main bracket 301 may include a first main bracket end portion 308 and a second main bracket end portion 309. At the first main bracket end portion 308, there may be a slot 310 or elongated embrasure. At the second main bracket end portion 309 there may a hole or aperture. The first pivoting assembly bracket 302 at one end may be . . . slidably attached to the first main bracket end portion 308. As seen in FIG. 1, the first pivoting assembly bracket 302 is attached by a fastener, such as but without limitation, a bolt or a dowel and may slide along the slot 310. The vibration absorber holder 400 is attached to the first pivoting assembly bracket 302 at the other end of the first pivoting assembly bracket 302. The linkage 305 is rotatably attached to the second main bracket end portion 309 at one end of the linkage 305, and rotatably attached to the second pivoting assembly bracket 303 at the second end. The stabilizer 306 is attached to the linkage 305 at a point between the two ends. The stabilizer 306 is rotatably attached to the linkage 305 at one end and rotatably attached to the pivoting assembly main bracket 301 at the other end. The stabilizer 306 may be a two-link system, with a first stabilizer link 316 and a second stabilizer link 311, that allows upward, downward and angular movement of the vibration absorber holder 400. The first stabilizer link 316 and the second stabilizer link 311 may be rotatably attached to each other.

As seen in FIG. 2, the preferred embodiment of pivoting assembly 300 includes two pivoting assembly main brackets 301, two first pivoting assembly brackets 302, two second pivoting assembly brackets 303, two stabilizers 306, and two linkages 305. They may all be parallel to each other. A stabilizing block 314 may be located between the two pivoting assembly main brackets 301. Another embodiment may include two substantially similar separate pivoting assemblies 300 that perform the same function and operate in tandem.

The vibration absorber jack 10 may also include a pivoting assembly handle 312. The pivoting assembly handle 312 moves the linkage(s) 305 such that the vibration absorber holder 400 may be angled and angularly adjusted.

Figure 3:
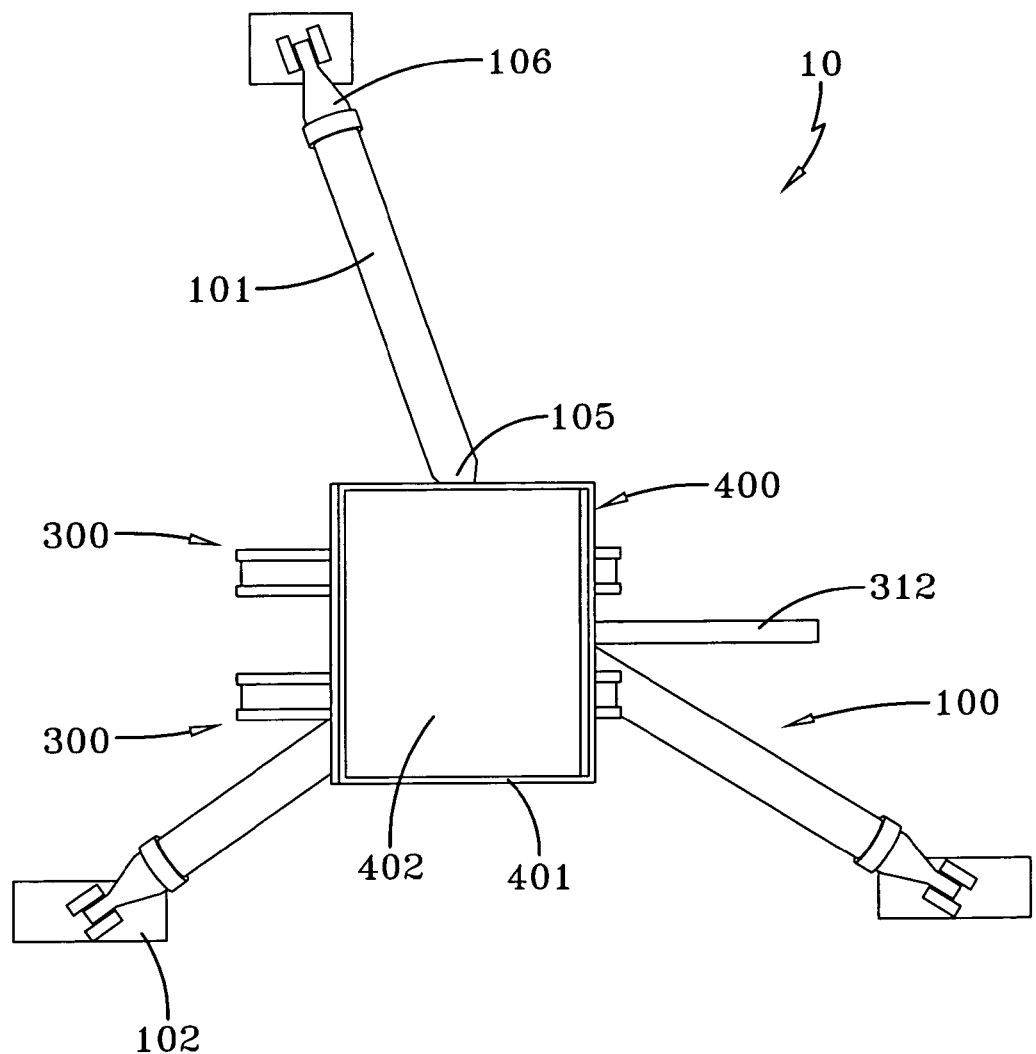
FIG. 3 is a top view of an embodiment of the vibration absorber jack.

The vibration absorber holder 400 may be a substantially flat surface that can balance and hold the vibration absorber. As seen in FIGS. 2 and 3, the vibration absorber holder 400 may be substantially rectangular and include a holder lip 401 enveloping a holder base 402.

When introducing elements of the present invention or the preferred embodiment(s) thereof, the articles "a," "an," "the," and "said" are intended to mean there are one or more of the elements. The terms "comprising," "including," and "having" are intended to be inclusive and mean that there may be additional elements other than the listed elements.

Although the present invention has been described in considerable detail with reference to certain preferred versions thereof, other versions are possible. Therefore, the spirit and scope of the appended claims should not be limited to the description of the preferred versions contained herein.

What is claimed is:

1. A vibration absorber jack for installing vibration absorbers in aircraft, the vibration absorber jack, comprising:
    a tripod type base;
    a ball-screw jack, the ball-screw jack attached to the tripod type base, the ball-screw jack includes a jack wheel for adjusting height of the ball-screw jack;
    a pivoting assembly, the pivoting assembly disposed on top of the ball-screw jack, the jack wheel able to adjust the height of the pivoting assembly, the pivoting assembly including a pivoting assembly main bracket, a first pivoting assembly bracket, a second pivoting assembly bracket, a stabilizer, and a linkage; the first pivoting assembly bracket slidably attached to the pivoting assembly main bracket, the linkage and the stabilizer rotatably attached to the pivoting assembly main bracket, the linkage rotatably attached to the second pivoting assembly bracket, the stabilizer rotatably attached to the linkage; and,
    a vibration absorber holder, the vibration absorber holder attached to the first pivoting assembly bracket and the second pivoting assembly bracket such that the vibration absorber holder can be positioned and moved by the pivoting assembly.

2. The vibration absorber jack of claim 1, the pivoting assembly main bracket including a slot, the first pivoting assembly bracket slidable attached to the pivoting assembly main bracket via the slot.

3. The vibration absorber jack of claim 2, wherein the pivoting assembly main bracket includes two bracket legs, the pivoting assembly main bracket being an angle bracket with an angle between the bracket legs at least 90 degrees but no more than 180 degrees.

4. The vibration absorber jack of claim 3, wherein the stabilizer is a two-link system, including a first stabilizer link and a second stabilizer link, the stabilizer allows upward, downward, and angular movement of the vibration absorber holder, the first stabilizer link and the second stabilizer link are rotatably attached to each other.

5. The vibrator absorber jack of claim 4, wherein the pivoting assembly further includes a handle for adjusting the pivoting assembly and adjusting the position of the vibration absorber holder.

6. The vibrator absorber jack of claim 5, wherein the ball-screw jack also includes a worm gear assembly and a jack shaft, the worm gear assembly, the jack wheel and the jack shaft communicate with each other such that when turning the jack wheel the worm gear assembly adjusts heightness of the jack shaft.

7. The vibrator absorber jack of claim 6, wherein the tripod type base includes three legs and tripod levers, the tripod levers are attached to each leg and slidably attached to the jack shaft such that the legs may be folded together.

8. The vibrator absorber jack of claim 7, wherein the vibration absorber jack further includes a collar, the collar is slidably disposed over the jack shaft, each leg is rotatably attached to the collar.

9. The vibrator absorber jack of claim 8, wherein the pivoting assembly includes two pivoting assembly main brackets, two first pivoting assembly brackets, two second pivoting assembly brackets, two stabilizers, and two linkages.

10. A vibration absorber jack for installing vibration absorbers in aircraft, the vibration absorber jack, comprising:
    a tripod type base;
    a ball-screw jack, the ball-screw jack attached to the tripod type base, the ball-screw jack includes a jack wheel for adjusting the ball-screw jack;
    two pivoting assemblies, the pivoting assemblies substantially parallel to each other and disposed on top of the ball-screw jack, the jack wheel able to adjust heightness of the pivoting assemblies, each pivoting assembly including a pivoting assembly main bracket, a first pivoting assembly bracket, a second pivoting assembly bracket, a stabilizer, and a linkage; the first pivoting assembly bracket slidably attached to the pivoting assembly main bracket, the linkage and the stabilizer rotatably attached to the pivoting assembly main bracket, the linkage rotatably attached to the second pivoting assembly bracket, the stabilizer rotatably attached to the linkage;
    a stabilizing block disposed between the two pivoting assemblies; and,
    a vibration absorber holder, the vibration absorber holder attached to each first pivoting assembly bracket and each second pivoting assembly bracket such that the vibration absorber holder can be positioned and moved by the pivoting assemblies; and,
    a handle for adjusting the pivoting assemblies and adjusting the position of the vibration absorber holder.

\* \* \* \* \*